United States Patent [19]

Manchak, Jr. et al.

[11] Patent Number: 5,156,818
[45] Date of Patent: Oct. 20, 1992

[54] BIAXIAL CASTING APPARATUS FOR ISOLATING RADIOACTIVE WASTE

[75] Inventors: Frank Manchak, Jr.; Frank Manchak, III, both of Goleta, Calif.

[73] Assignee: Alternative Technologies for Waste, Inc., Santa Barbara, Calif.

[21] Appl. No.: 717,540

[22] Filed: Jun. 19, 1991

Related U.S. Application Data

[62] Division of Ser. No. 614,285, Nov. 16, 1990, Pat. No. 5,075,045.

[51] Int. Cl.$^5$ ............................... G21C 1/00
[52] U.S. Cl. ....................... 422/159; 494/66; 494/85; 425/435; 425/433; 425/434; 425/429; 252/628; 252/633
[58] Field of Search ............... 422/159, 903; 423/DIG. 20; 494/66, 85; 264/0.5; 425/435, 433, 434, 429; 250/506.1

[56] References Cited

U.S. PATENT DOCUMENTS

| | | | |
|---|---|---|---|
| 3,173,175 | 3/1965 | Lemelson | 425/435 |
| 3,734,665 | 5/1973 | Guillaud | 425/174 |
| 3,741,707 | 6/1973 | Baumann et al. | 425/435 |
| 3,754,852 | 8/1973 | Rempel | 425/429 |
| 3,810,727 | 5/1974 | Pivar | 425/144 |
| 3,822,980 | 7/1974 | Graeper | 425/429 |
| 3,824,061 | 7/1974 | Giehler | 425/435 |
| 3,825,395 | 7/1974 | Pivar | 425/435 |
| 3,829,272 | 8/1974 | Carillon et al. | 425/430 |
| 4,114,802 | 9/1978 | Brown | 233/26 |
| 4,228,223 | 10/1980 | Knotek et al. | 428/558 |
| 4,230,660 | 10/1980 | Taylor et al. | 264/311 |
| 4,285,903 | 8/1981 | Lemelson | 264/310 |
| 4,572,959 | 2/1986 | Popp et al. | 250/506.1 |
| 4,611,980 | 9/1986 | Tsuji et al. | 425/435 |
| 4,659,511 | 4/1987 | Fukasawa et al. | 252/628 |
| 4,764,322 | 8/1988 | Pitany et al. | 264/71 |
| 4,783,232 | 11/1988 | Carbone et al. | 156/172 |
| 4,865,787 | 9/1989 | Vallance et al. | 264/101 |
| 4,897,221 | 1/1990 | Manchak, Jr. | 252/633 |
| 4,980,090 | 12/1990 | Manchak, Jr. | 252/628 |
| 5,008,045 | 4/1991 | Manchak, Jr. et al. | 252/633 |

Primary Examiner—Brooks H. Hunt
Assistant Examiner—Ngoclan T. Mai
Attorney, Agent, or Firm—Roth & Goldman

[57] ABSTRACT

Hazardous radioactive waste is compacted and cast into safely handled monolithic castings having a radiation barrier wall completely enclosing the radioactive waste by centrifugal casting processes in which the barrier wall may be either a pre-formed shell transported to the jobsite or it may be formed by biaxial centrifugal casting and curing of the barrier wall in a mold. When a pre-formed shell is used, means are provided for thickening the radiation barrier if necessary by biaxial casting of additional barrier material inside of the shell. Castable radioactive material is cast inside the barrier wall before removal of the casting mold from the finished cast monolith. The cast monolith is supported for rotation as the mold is removed therefrom so that additional impact resisting and radiation barrier material can also easily be applied to the exterior surface monolith if radiation leakage exceeds tolerance levels.

7 Claims, 7 Drawing Sheets

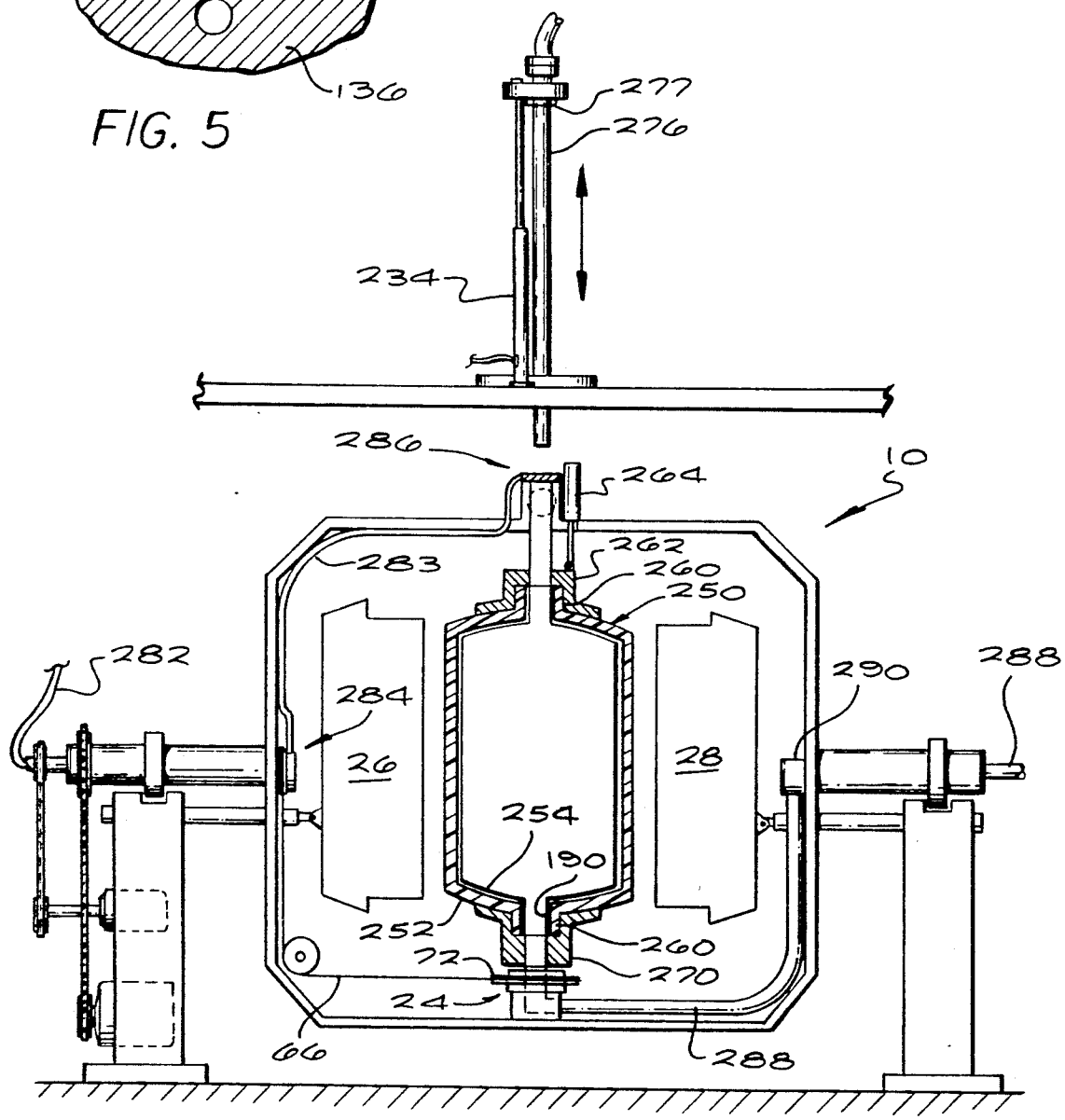

BIAXIAL CASTING APPARATUS FOR ISOLATING RADIOACTIVE WASTE

CROSS REFERENCES TO RELATED APPLICATIONS, IF ANY

This is a divisional of U.S. patent application Ser. No. 07/614,285 filed Nov. 16, 1990, now U.S. Pat. No. 5,075,045.

BACKGROUND OF THE INVENTION AND PRIOR ART

A wide range of radioactive waste processes are known for the isolation of a variety of low level wastes (LLW) and intermediate level wastes (ILW) by the use of volume reduction, and solidification. The resulting product of these processes, which may be substantially uncontaminated, slightly contaminated, or remain highly contaminated, is then usually packaged in drums or other containers for disposal.

Ideally, radioactive waste should be as substantially reduced in volume as is commercially practical due to the excessively high costs of disposal or storage. Typically, this is accomplished by tight packing into containers such as metal drums or the like. Such containers suffer from various disadvantages including the fact that they are usually round and therefore a considerable amount of storage space is lost due to the dead space between the containers. Additionally, such containers are known to bulge or corrode over time.

One improved method of reducing the volume of radioactive waste is uniaxial centrifugal casting thereof as is disclosed in U.S. Pat. No. 4,897,221 issued Jan. 30, 1990 to Frank Manchak, Jr.

Other uniaxial centrifugal waste casting methods are disclosed in U.S. application Ser. No. 328,020 filed Mar. 23, 1989 by Frank Manchak, Jr., et al, and in U.S. application Ser. No. 384,087 filed as a CIP of Ser. No. 328,020 on Jul. 21, 1989. These applications both disclose the use of reinforcing cages which are used in the casting mold.

It is now suspected, although not scientifically proven, that high density packing of radioactive waste not only reduces the volume to be stored, but also that such high density packing also provides greater inherent radiation shielding and reduced radiation leakage as compared to less dense packing. For some radioactive materials, high density packing is also suspected to reduce the radioactive half life, i.e., enhance the rate of radioactive decay.

A high density packing process and apparatus is desired so that hazardous radioactive waste can be more densely and rapidly compacted into a radiation shielded dense monolithic form having strength and structural integrity for transport and which can be monitored for radiation compliance and, if necessary, provided with additional radiation barrier material before leaving the centrifugal casting apparatus.

As referred to herein, the term "castable radioactive materials" is meant to comprise a hardenable mixture of radioactive waste materials and other waste materials mixed as necessary with one or more hardenable materials such as polyorganic compounds or cementitious materials or the like.

As used herein, the terms "monolith", "cast monolith" and "monolithic form" are intended to refer to a solidified casting having one or more layers of radiation encapsulating material on the exterior thereof. Such monoliths may be provided, as taught herein, either by casting the entire monolith including shell layers of impact resistant and radiation shielding materials and the hazardous waste at the jobsite or, in the alternative, by using pre-formed shells and merely casting the waste at the jobsite. In pre-formed shells are used, provision must be made for casting additional radiation barrier material inside of the pre-formed shells if jobsite conditions dictate.

SUMMARY OF THE INVENTION

In a first embodiment, the present invention provides a method of isolating hazardous radioactive waste for disposal comprising the steps of:

a) injecting a flowable charge of heat curable radiation shielding material into a rotatable mold, said charge being of volume calculated to provide a radiation barrier wall of selected minimum thickness on all interior surfaces of said mold;

b) rotating said mold to centrifugally distribute said radiation shielding material on the interior surfaces of said mold;

c) heating the walls of said mold during rotation thereof to cure and solidify said radiation barrier wall;

d) filling the cured radiation barrier wall with castable radioactive waste material while rotating said mold to centrifugally compact and cast said radioactive waste material inside of said barrier wall to form a monolith comprised of said cast waste material and barrier wall;

e) removing said mold from said monolith;

f) detecting the amount of leakage radiation emitted by said monolith;

g) applying additional radiation shielding material to the exterior surface of said monolith if the detected leakage radiation exceeds a predetermined threshold level; and h) transporting said monolith to a storage area.

The present invention further provides, in a first embodiment, an apparatus for isolating hazardous castable radioactive waste for disposal comprising:

a) a bifurcated centrifugal casting mold having at least two separable mold parts and fluid inlet and fluid outlet ports aligned along a first axis, said mold being supported for rotation about said first axis;

b) means for supporting a completed cast monolith in said apparatus with the mold parts removed therefrom;

c) powered drive means for rotating said mold and said monolith about said first axis;

d) mold removal means aligned along a second axis substantially perpendicular to said first axis for removing the separate parts of said bifurcated casting mold from a cast monolith while leaving said monolith supported in said apparatus for rotation about said first axis;

e) means for injecting a charge of radiation shielding material into said mold and for filling said mold with castable radioactive waste material;

f) means for heating said mold during rotation of said mold about said first axis;

g) means for detecting radiation emitted by a cast monolith comprised of an external barrier of said radiation shielding material substantially encapsulating cast radioactive waste; and h) means for applying additional radiation shielding material to said monolith if needed.

Preferably, centrifugal casting of the radiation barrier shielding material is accomplished by simultaneously rotating the casting mold about two mutually perpendicular axes so that a particularly dense radiation shielding barrier wall is formed which will contain the radioactive waste material. Separable mold parts are then removed from the cast monolith while still leaving the monolith supported for rotation in the centrifugal casting apparatus. Additional radiation shielding and/or structural integrity are attained, if necessary, by winding a strand of fiber composite material about the formed monolith.

In a second embodiment, the invention provides a method of isolating hazardous radioactive waste for disposal comprising the steps of:
a) placing a hardened pre-formed shell of impact resistant radiation shielding material in a rotatable mold;
b) making a preliminary determination of the probable radioactivity of waste material to be cast in said shell;
c) injecting a flowable charge of hardenable radiation shielding material into said shell if the preliminary determination of radioactivity exceeds a threshold value, said charge being of volume calculated to provide said shell with an additional radiation barrier wall of selected minimum thickness on all interior surfaces of said shell;
d) rotating said mold and said shell to centrifugally distribute said additional radiation shielding material on the interior surfaces of said shell;
e) curing said additional radiation shielding material by heating said material during rotation of the mold to harden and solidify said additional radiation shielding material inside said shell;
f) filling the shell with castable radioactive waste material while rotating said mold to centrifugally compact and cast said radioactive waste material inside of said shell to form a monolith comprised of said cast waste material and said shell;
g) removing said mold from said monolith;
h) detecting the amount of leakage radiation emitted by said monolith;
i) applying additional radiation shielding material to the exterior surface of said monolith if the detected leakage radiation exceeds a predetermined threshold level; and
j) transporting said monolith to a storage area.

In the second embodiment, the invention also provides apparatus for isolating hazardous castable radioactive waste for disposal comprising:
a) a bifurcated centrifugal casting mold having at least two separable mold parts, said mold being supported for rotation about said first axis;
b) means for supporting a completed cast monolith in said apparatus with the mold parts removed therefrom;
c) powered drive means for rotating said mold and said monolith about said first axis;
d) mold removal means aligned along a second axis substantially perpendicular to said first axis for removing the separate parts of said bifurcated casting mold from a cast monolith while leaving said monolith supported in said apparatus for rotation about said first axis;
e) means for injecting a charge of radiation shielding material into a pre-formed shell placed in said mold and for filling said shell with castable radioactive waste material; and f) means for heating the interior of said shell during rotation of said mold about said first axis.

Further advantages of the preferred embodiments of the methods and apparatus disclosed herein include the fact that costly metal storage drums or steel reinforced concrete drums and the attendant corrosion thereof are eliminated; and that a means for removal of heat generated by radioactive decay and latent chemical reaction in the cast monolith is shown wherein a heat removal pipe, preferably ceramic, may be inserted into the substantially completed cast monolith before final completion of the monolith.

BRIEF DESCRIPTION OF THE DRAWINGS

FIG. 5 is a vertical cross section, to an enlarged scale, taken at line 5—5 on FIG. 4 showing a sliding seal between the top of the mold and a top swivel bottom portion which rotates with the mold;

FIG. 9 is an elevation view, like FIG. 2, of a second embodiment of the invention which is intended to use pre-formed shells which have been transported to the jobsite.

DESCRIPTION OF THE FIRST EMBODIMENT

Figure 1:
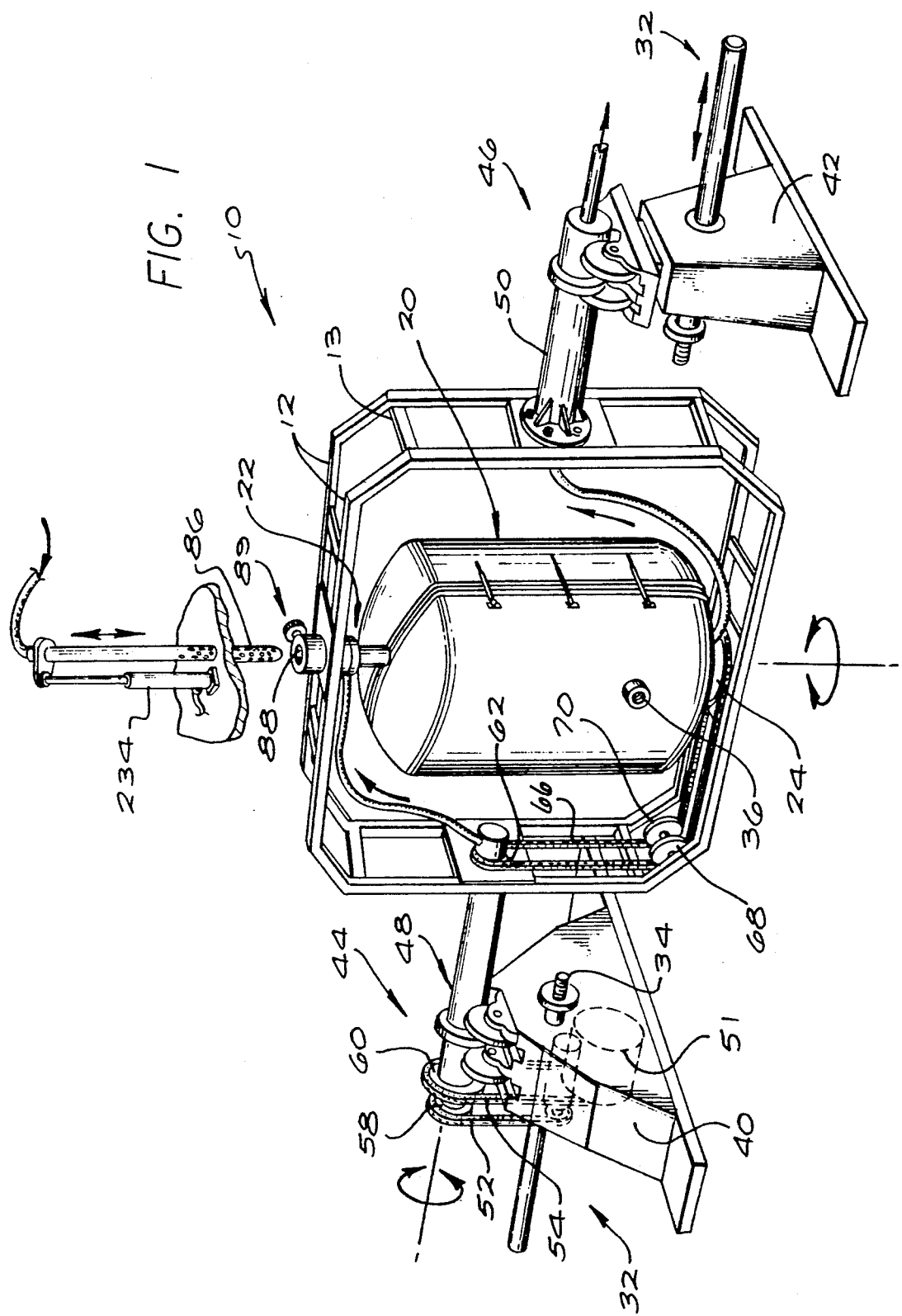
FIG. 1 is a perspective view of a centrifugal waste casting apparatus according to a first embodiment of the present invention.

As seen in FIG. 1 the first embodiment of the centrifugal casting apparatus includes a frame 10 comprised of a pair of generally parallel rectangular sub-frames 12 which are spaced apart from each other by a plurality of cross members 13.

A rotatable bifurcated casting mold 20 intended for casting of both an impact resistant radiation barrier shell and radioactive waste materials is supported for rotation about a first axis (vertical as seen in FIG. 1) in the frame by swivels 22, 24 at the top and bottom of the mold to be described.

Figure 2:
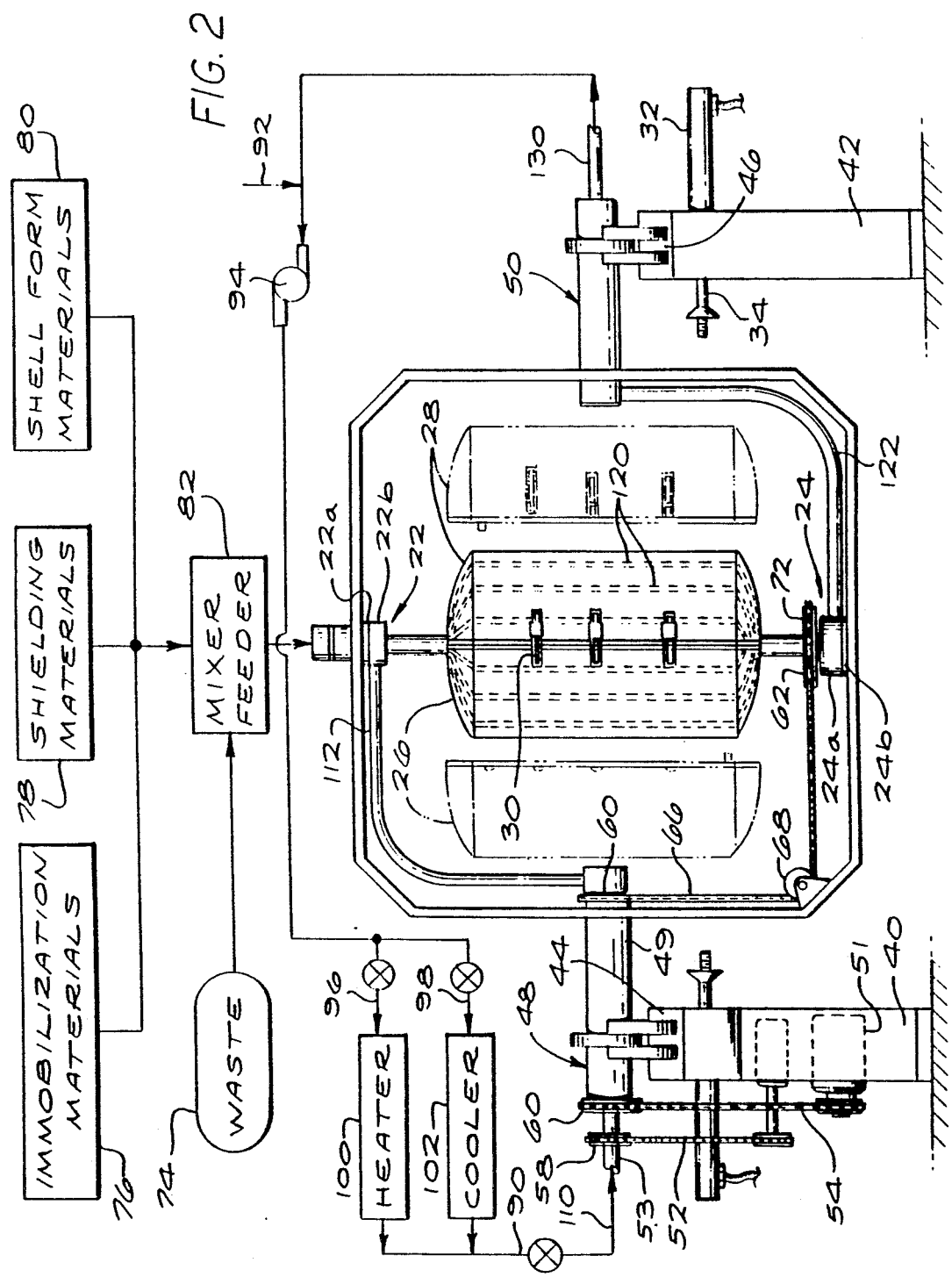
FIG. 2 is a front elevation view of the apparatus of FIG. 1, partially in schematic form.

The mold 20 is comprised of two separable mold halves 26, 28 (FIG. 2) which are held together by a plurality of fluid actuated latch members 30 which will be described with reference to FIG. 8. The mold halves are respectively moveable away from each other to the left and right as seen in FIG. 2 by a pair of linear actuators 32 which preferably have rotatable threaded male ends 34 which are receivable into female threaded apertures 36 (FIG. 1) in the mold halves. Means for rotating and longitudinally moving the actuators are conventional and are not shown.

The frame 10 (FIG. 1) is supported for rotation about a second (horizontal) axis which is perpendicular to the plane of the first axis of rotation mentioned above. The frame support is comprised of a pair of pedestals 40, 42 having roller supports 44, 46 mounted thereon for supporting a pair of concentric half axles 48, 50 on which the mold frame is rotatably mounted as shown.

A drive motor 51 (FIG. 2) is provided for actuating a pair of drive chains 52, 54 trained around a pair of drive sprockets 58, 60 which are in turn affixed to the left hand half axle 48 which is comprised of an outer drive portion 49 and an inner drive portion 53. The radially outer drive portion 49 of the half axle is fixedly attached to the frame 10 whereby the first drive chain 52 rotates the frame 10 about the horizontal axis of the half axles 48, 50. The second drive chain 54 is fixedly attached to the sprocket 60 which drives the radially inner portion 53 of the concentric drive axles, the inner end of which is seen extending through a bearing to the inside of the frame. A third drive chain 66 for rotating the mold about the first (vertical as seen in FIG. 1) axis is trained around a drive sprocket 62 mounted on the inner end of the inner drive portion 53 of the axle and is trained around a pair of idler pulleys 68 and into engagement with a mold drive sprocket 72 also seen in FIG. 4.

Turning now to FIG. 2, the separable mold halves 26, 28 are shown in closed or latched operative centrifugal casting position and, in phantom, are shown in the open position. Opening of the mold is accomplished by longitudinally extending the pair of rotatable linear actuators 32 such that the male threaded ends 34 engage the female threaded apertures 36 (FIG. 1) provided in the mold halves following which the actuators are rotated to affix the male ends to the mold halves. The actuators are then linearly retracted to open the mold. It will be appreciated that the actuators are shown schematically and comprise only one of a number of possible different forms of mold opening and closing means which might be used. Mechanical latches or magnetic affixation of the actuators to metallic receptor plates on the mold halves may be used instead of rotatable linear actuators provided with threaded ends.

When the mold halves 26, 28 are in the closed and latched position, castable radioactive waste materials as well as radioactive shielding materials, shell forming materials and chemicals for immobilizing radioactive waste may be fed from sources 74, 76, 78, 80 thereof into the mold via a feeder mixer mechanism 82 and feed wand 86 (FIG. 1) which is received in an axial inlet passageway 88 of the top mold support swivel 22 mounted between the parallel sub-frames 12 as seen in FIG. 1.

Figure 4:
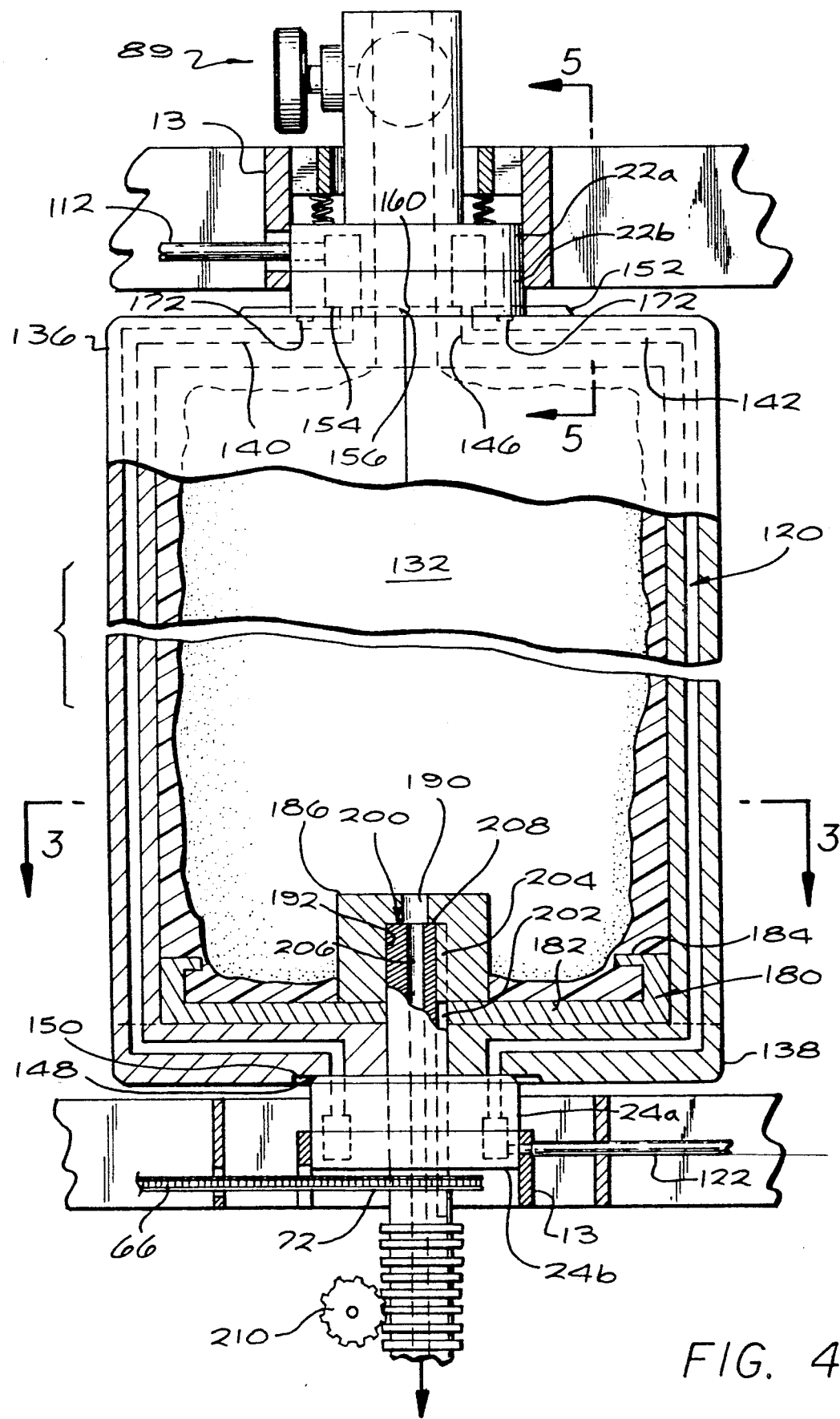
FIG. 4 is a vertical cross section of the mold apparatus shown in closed position.

Means are also provided for heating and cooling the mold walls in the embodiment shown in FIG. 2. These means are comprised of a heat transfer fluid conduit 90 which has a fluid supply inlet 92 and which is connected to a pump 94 and valve controlled branch conduits 96, 98 having means 100, 102 for heating and for cooling the heat transfer fluid disposed in series with the pump 94 in the conduit 90. Heat transfer fluid is admitted through a valved inlet fluid passageway 110 which extends through the inner drive portion 53 of the left hand support axle 48, thence via a fluid inlet line 112 to the stationary portion 22a of the top mold support swivel 22 which is mounted between cross members 13 in the frame (FIG. 4). The rotatable portion 22b of the top swivel is sealingly engageable with the top surface of the mold halves such that fluid communication is provided between the swivel 22 and fluid passageways 120 in the mold halves.

At the lower portion of the mold as best seen in FIGS. 2 and 4, the bottom swivel 24 serves as both a mold support and a fluid outlet. The lower, non-rotatable portion 24b of the bottom swivel is affixed to and mounted in frame cross members 13. A flexible heat transfer fluid outlet line 122 extends from the lower swivel 24 to an outlet passageway 130 of the heat fluid transfer conduit disposed coaxially in the right hand mold support half axle 50.

Figure 3:
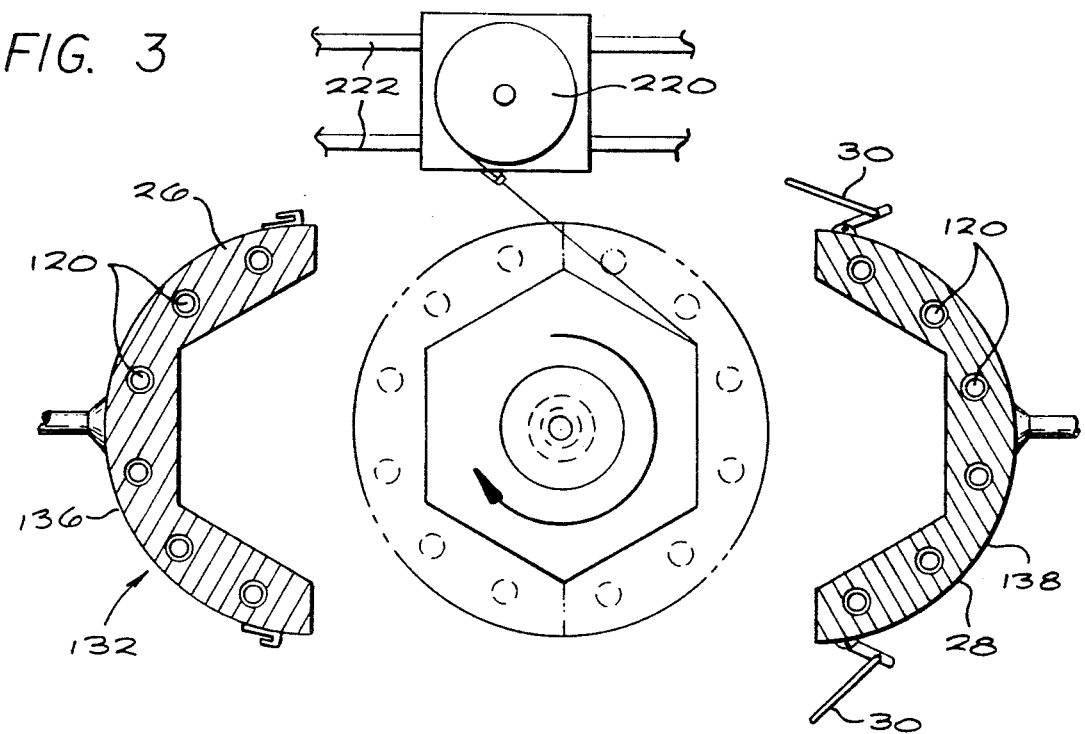
FIG. 3 is a horizontal cross section of the mold apparatus taken at line 3—3 of FIG. 4 showing the closed mold position in phantom.

FIG. 3 is a horizontal cross section of the mold apparatus taken at line 3—3 of FIG. 4 showing the mold halves in open position and, in phantom, the mold halves in closed position. Each mold half has a plurality of generally vertically oriented heat fluid transfer passageways 120 extending therethrough to permit heat transfer fluid to flow axially of the mold to thus rapidly heat or cool the mold walls and mold contents.

The inner configuration of the mold is preferably of a hexagonal or octagonal shape to result in finished cast monoliths of complimentary external shape which are easy to stack or pack together without lost space between adjacent monoliths.

FIG. 4 is a vertical cross section of the mold apparatus taken at line 4—4 on FIG. 3 and shows the mold being comprised preferably of a pair of C-shaped sidewall members 132, 134 to each of which are affixed a half of a top mold plate 136 and a half of a bottom mold plate 138. Each of the two halves of the top plate 136 and each of the two halves of the bottom plate 138 is provided with a plurality of radially extending bores 140, 142 for transmitting heat transfer fluid from axially extending fluid inlets 146 at the top of the mold to the vertically extending passageways 120 in the C-shaped sidewall members of the mold.

Sealing engagement between the upper and lower exterior surfaces of the mold halves and the respectively adjacent swivels is provided by a pair of parallel tracks 152 and grooves 154 and preferably by rubber seals disposed in grooves 172 in the mold top surface which extend transversely to the track and groove seals to be described.

As seen in FIG. 4, the mold is supported at the bottom on the bottom swivel 24 which is fixedly attached between spaced parallel lower frame cross members 13. The upper surface of the rotatable portion 24a of the bottom swivel is provided with a pair of spaced parallel tracks 148 which are sealingly received in a pair of spaced parallel grooves 150 on the bottom surfaces of the bottom mold plates 138 whereby the grooves and tracks may be aligned parallel with the axis of the linear mold actuators 32 to open and close the mold to bring the fluid passageways 120 in the mold into registry with mating fluid passageways in the rotatable portion 24a of the bottom swivel.

Similarly, at the top of the mold seen also in FIG. 5, the top swivel 22 is preferably spring biased downwardly against the upper mold surfaces so that it is sealingly engaged therewith via a similar groove and track arrangement to that provided at the bottom mold swivel 24 except that here the tracks 152 are provided on the top surface of the mold and the grooves 154 are provided on the underside of the top swivel. Chamfered camming edges 156, 160 in the locations shown on the upper mold tracks 152 and the grooves 154 on the upper mold support swivel 22 are provided to ensure that the upper swivel is raised slightly against the spring bias as the mold halves engage the swivels during movement of the mold halves together to close the mold. Similarly, at the bottom of the mold (FIG. 4), chamfers are provided on the slideably engaging surfaces of the grooves 150 and tracks 148 of the lower mold surface and bottom swivel, respectively.

Compressible elongated round rubber seals disposed in grooves 172 may be provided at the locations shown with the grooves 172 extending transversely between the track and groove seals previously described whereby the rubber seals may be compressed as the mold halves are moved together adjacent the upper and lower swivels 22, 24 (FIG. 2).

A consumable casting support 180 (FIG. 4) comprised of a generally flat disc or base plate 182 of peripheral shape complementary to the preferably hexagonal or octagonal shape of the mold cavity is provided at the bottom of the mold cavity. The consumable casting support has keying edges 184 as shown for locking the support to the cast materials. A boss 186 is provided on the upper surface (as shown) of the base plate and has a vertically extending drain recess 190 and an enlarged bore 192 concentric therewith which provides a horizontally extending support shoulder for the cast monolith. Means for rotating the mold about its axis (vertical as seen in FIG. 4) is provided by a mold drive shaft 200 having a keyed or splined end 202 engageable with a mating keyway or internal splines 204 on the upper rotatable part of the lower mold support swivel and in the lower mold end pieces. The drive shaft has an axially extending mold drain passageway 206 in fluid communication with the drain recess 190 in the casting support 180 and an upper supporting end which abuts the internal support shoulder in the boss 186. A rack and pinion mechanism 210 is connected to the drive shaft 200 as shown for lowering the shaft to thus remove it from the interior of the consumable casting support after the mold has been opened and the casting has been grasped and independently supported by, e.g., a forklift provided with grasping tongs. Clearance is provided for non-interfering longitudinal movement of the splined drive shaft through the lower portion of the swivel 24.

Figure 6:
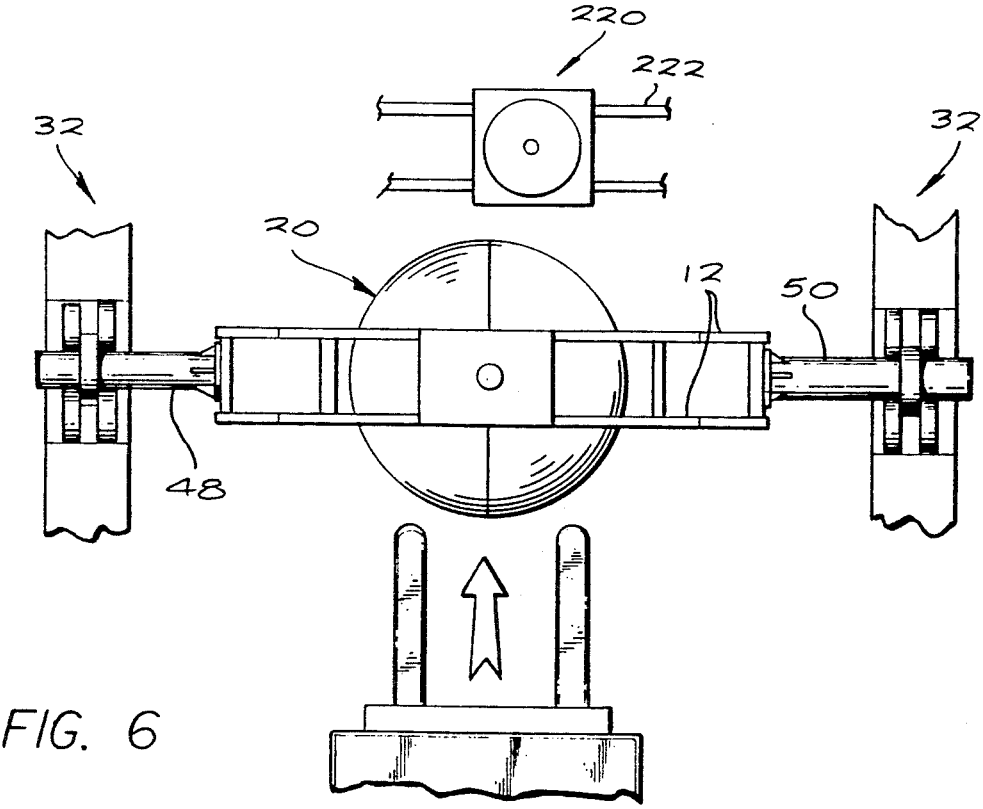
FIG. 6 is a top plan view of the apparatus of FIG. 1.

FIGS. 3 and 6 show a winder 220 for applying a filament strand or tape of reinforcing and radiation shielding material to the exterior surface of the cast monolith. As shown schematically, preferably the winder is horizontally moveable on a track 222 into and out of operative position and is vertically movable on a guide support 224 (FIG. 7) to permit the winding of the exterior surface of the monolith to take place vertically from end to end as the monolith is supported for rotation by the drive shaft 200 engaged with the support shoulder on the underside of the boss 186 after the mold halves 132, 134 have been removed.

Access of a forklift truck or the like to remove cast monoliths from the mold is from the front with the winder 220 being disposed at the rear of the apparatus as seen in FIG. 6. Alternatively, the cast monoliths may be oriented in a generally horizontal position for removal as will be described below.

Figure 7:
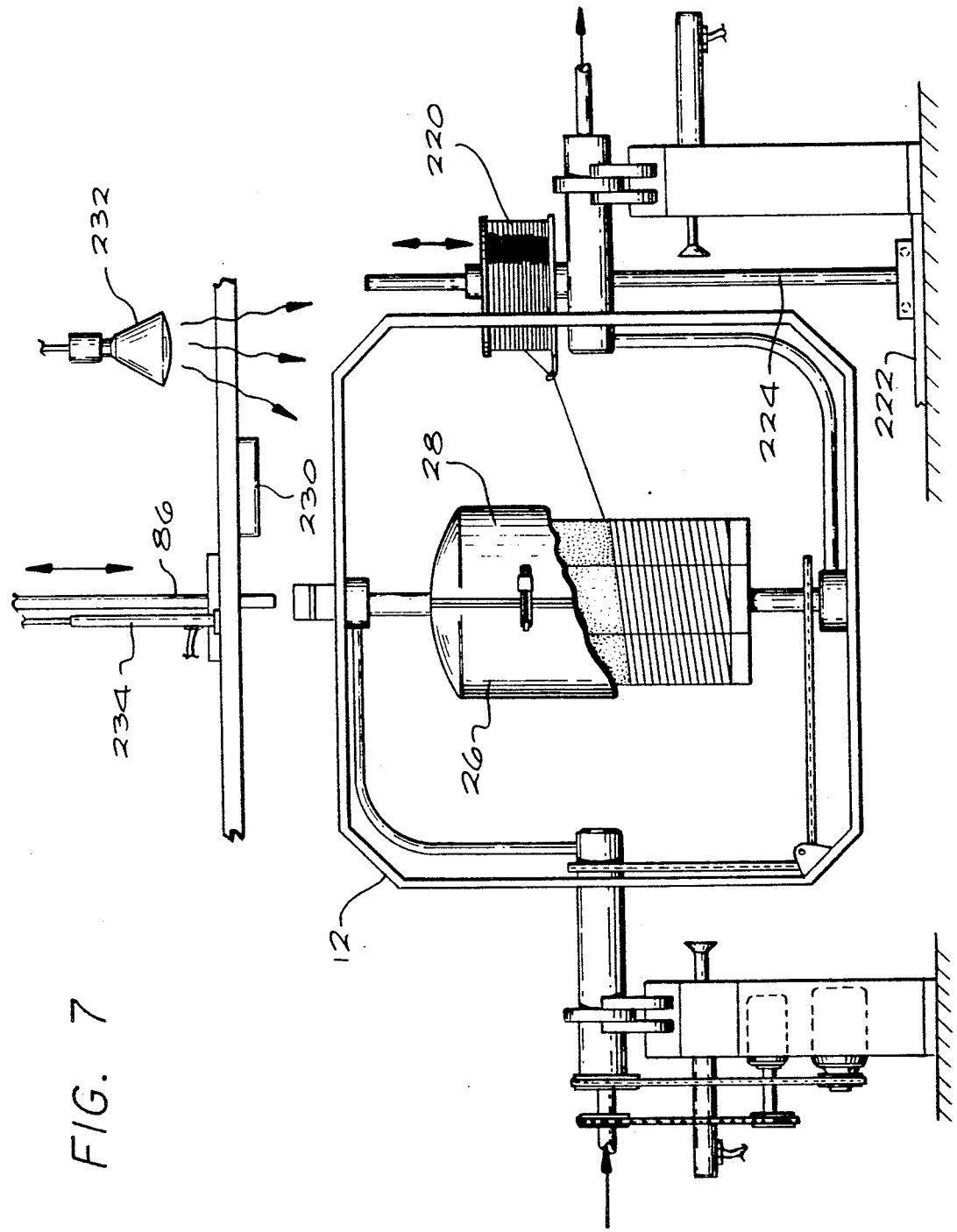
FIG. 7 is a right side elevation view of the apparatus of FIG. 1 which also schematically shows a winding apparatus and a mold feed line actuating apparatus.

FIG. 7 is a right side elevation view of the apparatus which shows the movement of the winder 220 along the vertically extending guide support 224. Also seen in FIG. 7 is a radiation detector 230 for detecting leakage radiation from the monolith. Heat curing lamps 232 are also optionally provided.

Feed of contents to be centrifugally cast in the mold is provided by the vertically extending feed wand 86 which is moved by a linear piston/cylinder actuator 234 into and out of a manually rotatable ball valve 89 (FIGS. 1 and 4) which controls the opening and closing of the top swivel inlet passageway 88.

Figure 8:
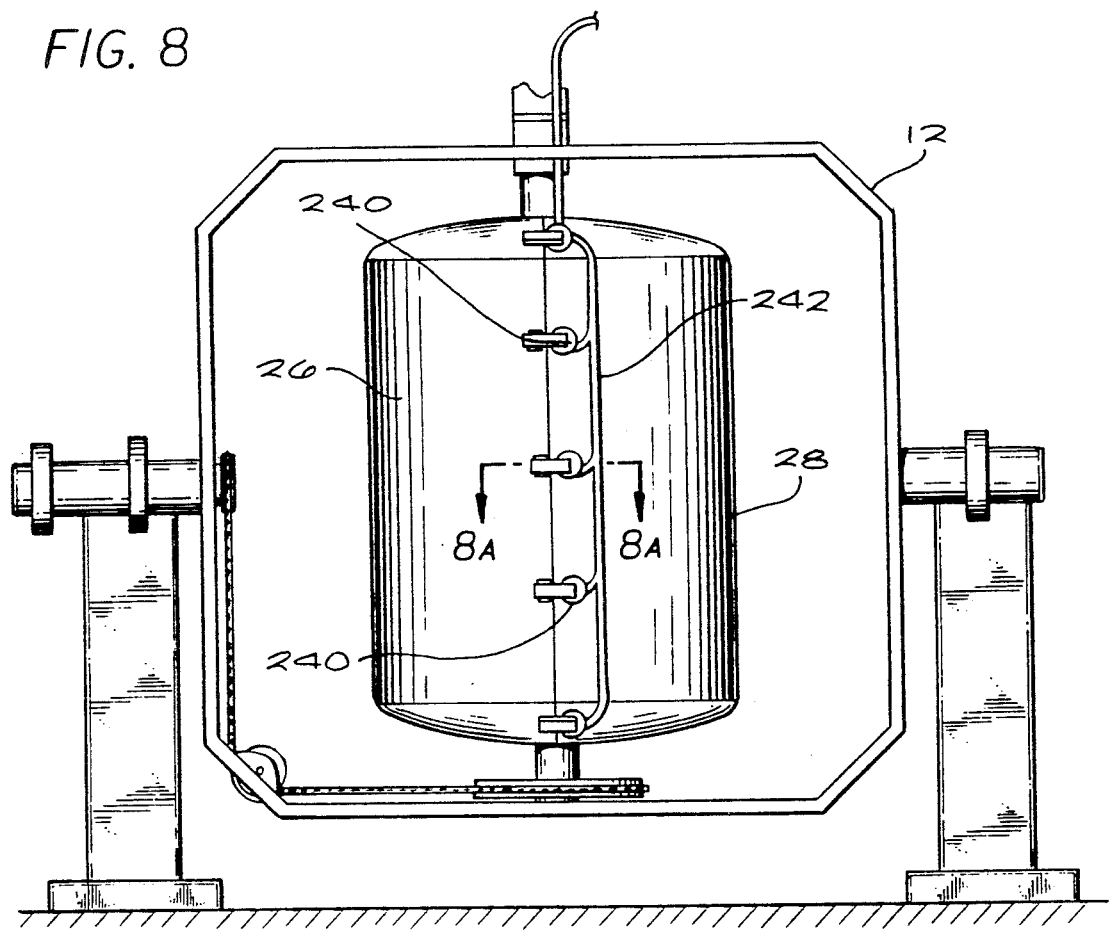
FIG. 8 is an elevation view showing the latched mold halves and FIG. 8A is an enlarged plan detail of one form of fluid actuated mold latching mechanism suitable with the present invention.
Figure 8A:
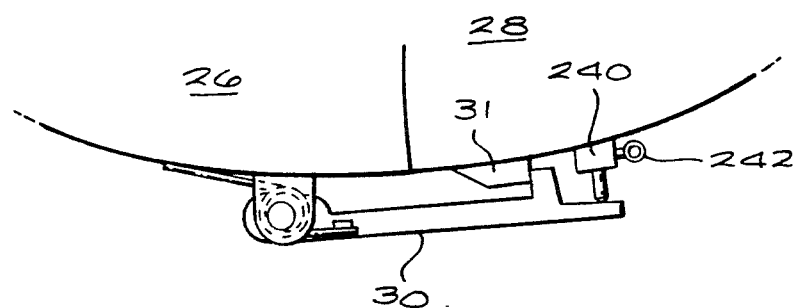

A quick release latch mechanism for opening and closing the mold halves is seen in FIG. 8 to comprise a plurality of individual latches 30 pivotally mounted to one mold half and spring biased into engagement with a catch 31 on the other mold half. A linear actuator 240 for releasing the latches is comprised of a cylinder and piston which is actuated by a fluid pressure control line 242 as desired when the casting apparatus is stationary. The latches 30 are preferably spring biased to the closed position.

OPERATION OF THE FIRST EMBODIMENT

Centrifugally cast monoliths comprised of immobilized radioactive waste solidified and encapsulated in a radiation impermeable shield are formed by first orientating the closed and latched casting mold in a position such that its axis of rotation is generally vertical as seen in FIG. 2 or slightly inclined from the vertical. The mold drain is closed by inserting the lower end of the feed wand 86 into the drain recess 190 (FIG. 4). Radiation barrier shield forming materials such as polypropylene and powdered resin boron particles are then fed from supply sources 78 (FIG. 2) thereof to the mixer feeder 82 which transmits a flowable charge of volume calculated to provide a barrier wall of selected thickness, e.g. $\frac{1}{4}$". The shield forming materials are then discharged at high pressure from radial apertures in the feed wand against the sidewall of the mold cavity as the feed wand is left in place with its lower end blocking the drain. The mold is rotated during the placement of the shielding materials solely about the axis of rotation defined by the upper and lower swivels 22, 24 during introduction of the charge into the mold to maintain the powdered shielding materials in engagement with the side walls of the mold.

When the calculated volume charge of material has been completely injected into the mold, the feed wand 86 is removed therefrom while the mold continues to be rotated to prevent the charge from clogging the drain recess 190. The ball valve 89 at the top mold support swivel is then rotated to close the top swivel inlet passageway after the feed wand is withdrawn. The frame drive means is then actuated to rotate the frame 10 about the horizontal frame support axis seen in FIGS. 1 and 2 whereby the mold is rotated biaxially at a selected speed to centrifugally distribute the radiation shielding material uniformly on the end walls as well as the side walls of the mold. Preferably, this thickness will be slightly less than the vertical extent of the boss 186. Careful control of the two rotation speeds of the mold about the two axes of rotation is necessary to ensure that the drain recess 190 remains unobstructed during placement of the radiation barrier wall materials.

Rapid curing and solidification of the shielding material in place on the inner surfaces of the mold cavity is accomplished during the biaxial rotation of the mold by pumping hot heat transfer fluid through the fluid transfer circuit which includes the passageways in the mold walls. This heats the mold to a temperature to rapidly melt the particulate shielding materials to form the radiation barrier. The heating ordinarily need not take place for more than about 45 seconds but the time will vary in practice depending upon the selected materials and intended barrier wall thickness. The mold 20 is then rapidly cooled to solidify the barrier wall by circulating cold heat transfer fluid through the mold passageways 120.

After the mold and heat cured radiation barrier have been cooled to ambient temperature, the mold rotation is terminated and the mold is again oriented such that its axis of rotation is substantially vertical and the ball valve 89 is opened for reception of the inlet feed wand 86 to introduce castable radioactive waste material. The feed wand 86 is inserted into the mold through the open ball valve and top swivel inlet passageway with the discharge end of the wand 86 being again placed closely adjacent the bottom of the mold cavity to block the drain recess 190. Rotation of the mold about its axis is then commenced. Radioactive waste and castable radioactive waste immobilization materials such as polyorganic compounds or cementitious materials or the like are then discharged to the mixer feeder 82 and pumped into the mold in correct proportions which result in a castable and hardenable mixture. The mold is uniaxially rotated about its axis of rotation during feed of the mixed radioactive waste and waste immobilization materials to densely compact the waste inside of the formed radiation barrier. Excess liquid squeezed out of the castable materials during the centrifugal casting thereof is removed via the drain as the feed wand 86 is gradually withdrawn out of the mold as casting proceeds to completion.

As casting of the mixed radioactive waste and immobilization materials progresses substantially to completion, the unfilled portion of the mold gradually shrinks and ultimately is in the shape of a centrally located generally cylindrical portion aligned with the axis of rotation of the mold. Casting of the radioactive materials is terminated when the mold is substantially filled except for the cylindrical unfilled mold central portion of a predetermined diameter not less than the diameter of the drain recess 190 which must remain unobstructed during casting.

Since castings containing some types of radioactive waste such as Gamma radiation and other chemical waste often generate heat, it is a relatively simple matter to insert a consumable elongated generally cylindrical heat removal pipe (not shown) in the cylindrical unfilled portion of the mold after the casting is substantially complete if substantial heat generation is expected. The heat removal pipe is typically a ceramic conduit which can be finally affixed in place by injection of grout or cement into the annular clearance space left between the cast radioactive waste and the heat removal pipe. Placement of the heat removal pipe, if desired, in the cast monolith can take place either before or after removal of the mold parts from the monolith.

A particularly important feature of the invention is the fact that the mold is removed from the monolith (rather than the monolith being removed from the mold) leaving the monolith supported (by the drive shaft 200) with its axis substantially vertical by a single consumable base plate 180 after the centrifugal casting operation is completed. Alternatively, two base plates can be used, one at either end of the monolith, whereby the monolith can be oriented with its axis generally horizontal and supported at each of its ends by the base plates which remain temporarily connected to the frame. The radiation detector 230 (FIG. 7) is placed in close proximity to the cast monolith to determine if detected leakage radiation exceeds a predetermined threshold level. If the castings are seen to be emitting excessive radiation despite the presence of the centrifugally cast radiation barrier, additional radiation barrier material can easily be applied by the winder 220 to the exterior of the monolith before it is removed from the apparatus.

Although additional radiation shielding material can be applied e.g., by a spray on coating while rotating the monolith about its axis, a particularly advantageous manner of applying additional radiation shielding material consists of rotating the casting and thereby drawing a strand or tape of filamentary composite fiber material from the winder 220 to wind it onto the exterior surface of the monolith. Such wound on material provides additional structural support if needed as well as additional radiation barrier where required. A particularly advantageous material for this purpose comprises resin impregnated filaments selected from the group consisting of carbon, boron, fiberglass, polyester, organic fiber, metal fiber and composites thereof.

The winder 220 is moveable on a track 222 so that it can be moved into and out of operative locations in proximity to the rotating mold apparatus as desired. Full details of the winder mechanism are not provided since it is believed well within the skill of the average person in the art to provide a suitable means for winding filamentary material onto the casting as it is supported in the apparatus.

The completed monolith may be removed from the centrifugal casting apparatus by first orienting the mold such that its axis of rotation is generally vertical as seen in FIG. 1. The mold halves will have been withdrawn to the open position leaving the cast monolith supported on its base plate by engagement of the end of the drive shaft 220 with the shoulder on the undersurface of the boss 186. The frame is accessible from the front (as seen in FIG. 1) of the apparatus to a forklift provided with gripping tongs or other apparatus which is capable of grasping the monolith (which at this time is supported merely from below by the drive shaft) to hold the monolith independently of the support provided from below. Subsequently, the rack and pinion 210 mechanism is actuated to lower the drive shaft completely from the cast monolith and out of engagement therewith. The cast monolith is then easily removed from the centrifugal casting apparatus.

Alternatively, as indicated above, the finished monolith may be supported in the frame by consumable end pieces provided at both ends of the monolith. The monolith is then oriented such that its axis is horizontal so that a material lift may be employed to support the monolith from below before disconnecting the frame support from the consumable end pieces.

Although the presently preferred method of supporting and removing the cast monolith is by first orienting it in the vertical position shown, it will be appreciated by persons skilled in the art that, with some modification, the cast monolith could be oriented horizontally with support from both ends similar to that currently shown in the single ended support provided by the drive shaft and rack and pinion mechanism.

THE SECOND EMBODIMENT AND OPERATION THEREOF

Since it is occasionally more economical to use preformed impact resistant radiation barrier shells 250 which are shipped separately to the jobsite, a modified second embodiment of the invention is seen in FIG. 9 to comprise a bifurcated mold in which the fluid conduits needed for heating and cooling the mold halves are unnecessary due to the use of pre-formed shells. Each pre-formed shell 250 will ordinarily comprise a multilayer shell having an external layer 252 of impact resisting material and an inner layer 254 of radiation barrier material. Parts of the second embodiment which are common to those of the first embodiment are identified with the same reference numerals and will not be described again.

An axially extending hub 260 at either end of the pre-formed shell is provided for supporting the shell by apparatus to be described. An annular retaining collar 262 is mounted in the frame at the location shown and is moveable with respect to the frame along an axis (vertical as seen in FIG. 9) by a linear actuator 264 or by a rack and pinion or similar well known mechanism whereby the collar 262 may easily be slipped onto and off of the shell hub 260 when a shell is to be placed in the apparatus or a finished monolith is to be removed.

At the lower end of the apparatus (as seen in FIG. 9) the stationary portion of swivel 24 is mounted in the frame 10 and its rotatable portion is affixed to a rotatable chuck 270 having radially moveable jaws for gripping and releasing the shell hub 260. Drive chain 66 is trained around affixed to drive sprocket 72 which is fastened to the rotatable portion of the swivel 24.

Due to the insulation provided by the pre-formed shell adjacent the interior wall of the mold, it is more efficient to cure the added cast radiation barrier material (if needed) from the inside of the mold cavity than by heating the mold walls as was done in the first embodiment. When it is determined that the radioactive waste to be disposed of emits more radioactivity than can be effectively blocked by the pre-formed shell, a charge of castable radiation shielding material may be injected from the feed wand 86 into the shell 250. The mold halves 26, 28 are closed about the shell 250 to provide the necessary structural support during the high speed biaxial casting and curing of the additional radiation barrier and the actuators 32 are then removed to the inoperative position.

Rotation of the mold and shell about the axis of the shell is commenced to evenly distribute the charge about the vertically extending sides of the shell 250. Subsequently, a detachable elongated electrically energized heating wand 276 is placed by actuator 234 in the shell and is held axially therein by disposing one of the ends of the wand in the fluid drain 190 in the lower shell hub 260 and the other end in the inlet in the upper shell hub 262.

Electrical power is supplied to the wand during biaxial rotation of the mold by electrical leads 282 extending through the left hand axle to the stationary portion of an electrical swivel 284 and by leads 283 extending from the rotatable portion of the electrical swivel 284 to a stationary electrical collar 286 mounted in the frame. The power receiving end collar 277 of the heating wand is affixed to and rotatably contacts the electrical collar 286 whereby the wand 276 may be energized to heat and cure the radiation barrier material during simultaneous rotation of the pre-manufactured shell 250 about two mutually perpendicular axes.

Fluids generated during waste casting are removed from the shell by the shell drain 190 which continues through the swivel and a drain conduit 288 to a fluid swivel 290 axially aligned with the right hand frame support bearing. A vacuum pump, not shown, facilitates drainage of excess liquids during casting.

The winding apparatus shown with the first described embodiment of the invention is not strictly necessary but may optionally be provided with the second (FIG. 9) embodiment since the FIG. 9 embodiment provides a pre-formed shell which has enough impact resistance for structurally supporting the monolith and provides a means of casting additional radiation shielding material inside the shell if needed.

Persons skilled in the art will readily appreciate that various modifications can be made from the preferred embodiment thus the scope of protection is intended to be defined only by the limitations of the appended claims.

We claim:

1. Apparatus for isolating hazardous radioactive waste for disposal comprising:
   a) a bifurcated centrifugal casting mold having at least two separable mold parts, said mold being supported for rotation about a first axis;
   b) means for supporting a completed monolith in said apparatus with the mold parts removed therefrom;
   c) powered drive means for rotating said mold and said monolith about said first axis;
   d) mold removal means aligned along a second axis substantially perpendicular to said first axis for removing the separate parts of said bifurcated casting mold from a monolith while leaving said monolith supported in said apparatus for rotation about said first axis;
   e) means for injecting a charge of radiation shielding material into a pre-formed shell placed in said mold; and
   f) means for heating the interior of said shell during rotation of said mold about said first axis.

2. The apparatus of claim 1, wherein said means for supporting comprises a gripping chuck and a retaining collar each having an aperture for receiving an axially extending hub on said shell, said gripping chuck and said retaining collar being moveable toward and away from each other along said first axis into and out of engagement with said hubs for supporting said shell.

3. The apparatus of claim 1, wherein said mold removal means comprises: a pair of linear actuators, each of said actuators having a mold engaging end which is removeably attachable to a respective one of said mold halves for supporting said mold halves when said actuators are attached thereto.

4. The apparatus of claim 3, further comprising a threaded connector affixed to the mold engaging end of each of said actuators, said mold halves each have a threaded connector affixed thereto for engagement with said actuator connectors, and means for rotating said actuator connectors.

5. The apparatus of claim 1, wherein said means for injecting comprises: an elongated generally cylindrical feed wand receivable in said shell through a fluid inlet port, said wand having a distal end which is receivable in a fluid outlet port to block said outlet port.

6. The apparatus of claim 5, further comprising means for moving said feed wand longitudinally into and out of said shell.

7. The apparatus of claim 5, wherein said means for heating comprises an elongated electrical radiation heater disposed in said shell and extending axially therein from end to end of said shell for blocking both said fluid inlet port and said fluid outlet port during biaxial rotation of said shell during curing of said radiation shielding material therein.

* * * * *